US009918540B2

(12) United States Patent
Fawcett et al.

(10) Patent No.: US 9,918,540 B2
(45) Date of Patent: Mar. 20, 2018

(54) SUPPORT VEST

(71) Applicants: John Christopher Fawcett, Antrim (GB); Garrett W. Brown, Philadelphia, PA (US); Jerry Holway, Exton, PA (US)

(72) Inventors: John Christopher Fawcett, Antrim (GB); Garrett W. Brown, Philadelphia, PA (US); Jerry Holway, Exton, PA (US)

( * ) Notice: Subject to any disclaimer, the term of this patent is extended or adjusted under 35 U.S.C. 154(b) by 483 days.

(21) Appl. No.: 14/388,062

(22) PCT Filed: Apr. 9, 2013

(86) PCT No.: PCT/US2013/035762
§ 371 (c)(1),
(2) Date: Sep. 25, 2014

(87) PCT Pub. No.: WO2013/155065
PCT Pub. Date: Oct. 17, 2013

(65) Prior Publication Data
US 2015/0048134 A1    Feb. 19, 2015

Related U.S. Application Data

(60) Provisional application No. 61/621,793, filed on Apr. 9, 2012.

(51) Int. Cl.
*A45F 5/00* (2006.01)
*A45F 3/00* (2006.01)
(Continued)

(52) U.S. Cl.
CPC ............... *A45F 3/00* (2013.01); *A45F 5/00* (2013.01); *F16M 13/04* (2013.01); *A45F 2003/146* (2013.01); *A45F 2200/0533* (2013.01)

(58) Field of Classification Search
CPC ........ A45F 3/00; A45F 5/00; A45F 2200/0533; A45F 2003/146; F16M 13/04
(Continued)

(56) References Cited

U.S. PATENT DOCUMENTS 2,760,699 A * 8/1956 Rivers-MacPherson . A45F 3/04
224/201
2,886,031 A * 5/1959 Robbins ................... A61F 5/024
602/19
(Continued)

FOREIGN PATENT DOCUMENTS

| CA | 2433252 A1 | 12/2004 |
|---|---|---|
| WO | 2013008001 A1 | 1/2013 |
| WO | 2014140519 A1 | 9/2014 |

OTHER PUBLICATIONS

International Search Report and Written Opinion for PCT/US2013/035762, dated Jul. 12, 2013.
(Continued)

*Primary Examiner* — Adam Waggenspack
*Assistant Examiner* — Lester L Vanterpool
(74) *Attorney, Agent, or Firm* — Joan T. Kluger; Barnes & Thornburg LLP

(57) ABSTRACT

A support vest configured to conform to a wearer's natural movements, allowing forces to be applied to selected areas, and permitting varying attachment points for a supported load. The support vest has a waistband, ventral and dorsal spar systems extending upward therefrom, the ventral and dorsal spar systems attached to a ventral and dorsal plate, respectively and connected to one another via should straps. Pivot systems are provided at the superior and inferior ends of the spar systems.

19 Claims, 12 Drawing Sheets

(51) Int. Cl.
*F16M 13/04* (2006.01)
*A45F 3/14* (2006.01)

(58) Field of Classification Search
USPC .................................................. 224/576, 271
See application file for complete search history.

(56) References Cited

U.S. PATENT DOCUMENTS

| | | | | | |
|---|---|---|---|---|---|
| 3,548,817 | A | * | 12/1970 | Mittasch | A61F 5/024 602/19 |
| 4,158,490 | A | * | 6/1979 | Gottschalk | F16M 11/04 224/908 |
| 4,298,149 | A | * | 11/1981 | Gottschalk | A45F 3/10 224/201 |
| 4,715,362 | A | * | 12/1987 | Scott | A61F 5/024 602/19 |
| 4,892,240 | A | * | 1/1990 | Bell | A45F 3/08 224/153 |
| 5,042,763 | A | * | 8/1991 | Wong | F16M 13/02 224/265 |
| 5,088,634 | A | * | 2/1992 | MacLaren | A45F 5/00 224/268 |
| 5,360,196 | A | * | 11/1994 | DiGiulio | F16M 13/04 224/908 |
| 5,435,515 | A | * | 7/1995 | DiGiulio | F16M 11/04 224/908 |
| 6,280,405 | B1 | * | 8/2001 | Broselid | A61F 5/024 128/874 |
| 6,651,594 | B1 | * | 11/2003 | Bagwell | A47D 13/086 119/770 |
| 6,764,231 | B1 | * | 7/2004 | Shubert | F16M 13/04 396/419 |
| 7,646,424 | B2 | * | 1/2010 | Schaller | H04N 5/222 348/373 |
| 8,182,439 | B2 | * | 5/2012 | Glenn | A45F 3/14 224/637 |
| 8,353,434 | B2 | * | 1/2013 | Clayton, III | A45F 3/10 224/272 |
| 2007/0090143 | A1 | * | 4/2007 | Clayton, III | A45F 3/10 224/637 |
| 2012/0227209 | A1 | * | 9/2012 | Vinson | A45F 3/14 15/339 |

OTHER PUBLICATIONS

Extended European Search Report dated Nov. 18, 2015 in European Patent Application No. 13775033.7.

* cited by examiner

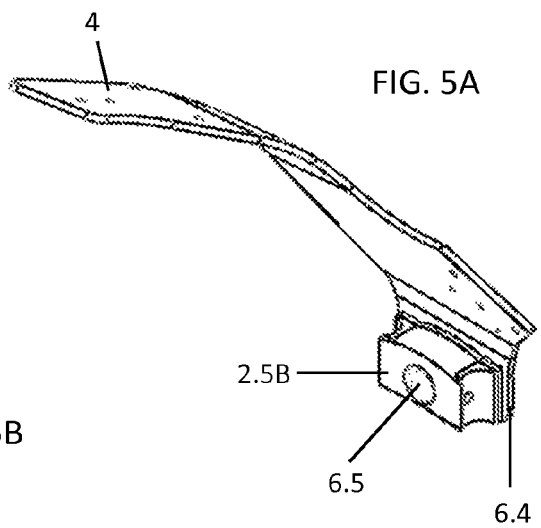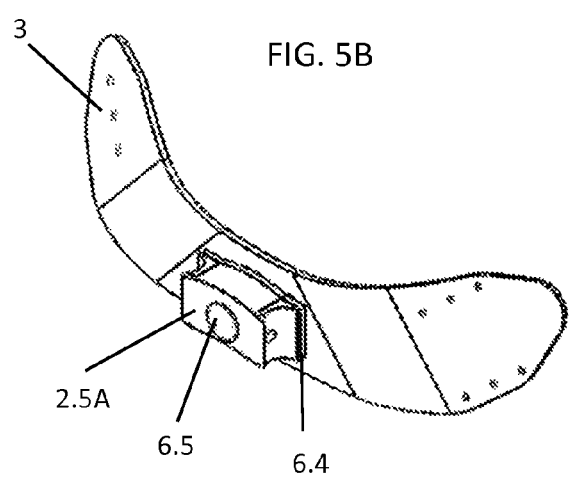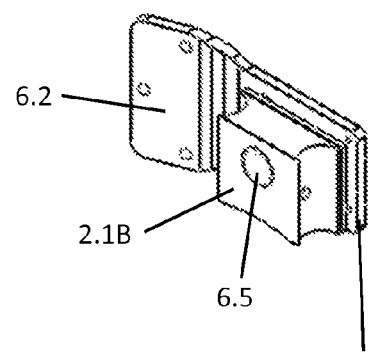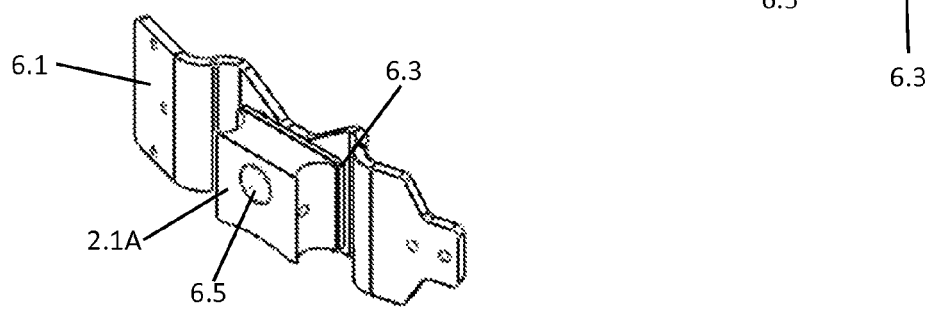

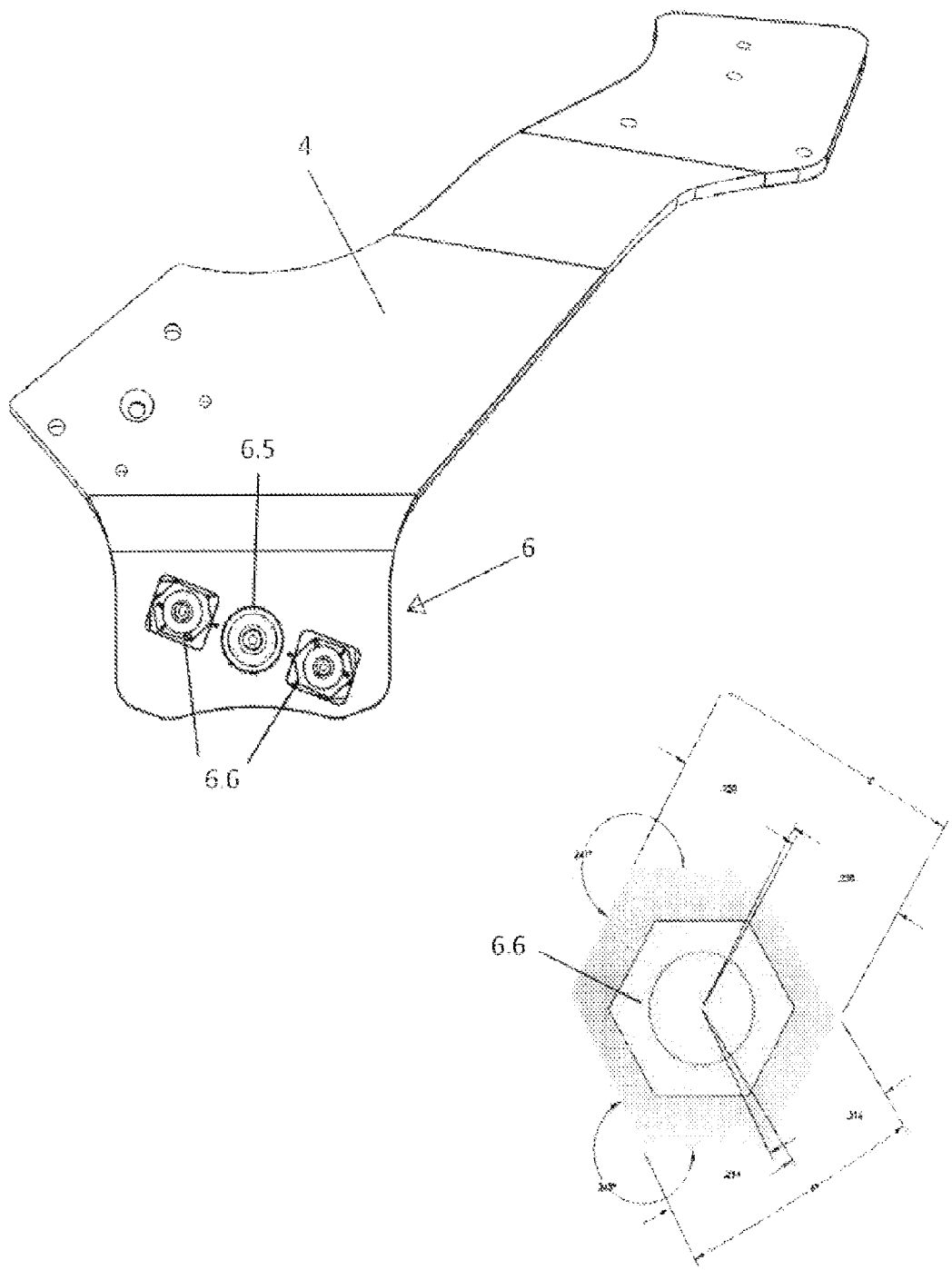

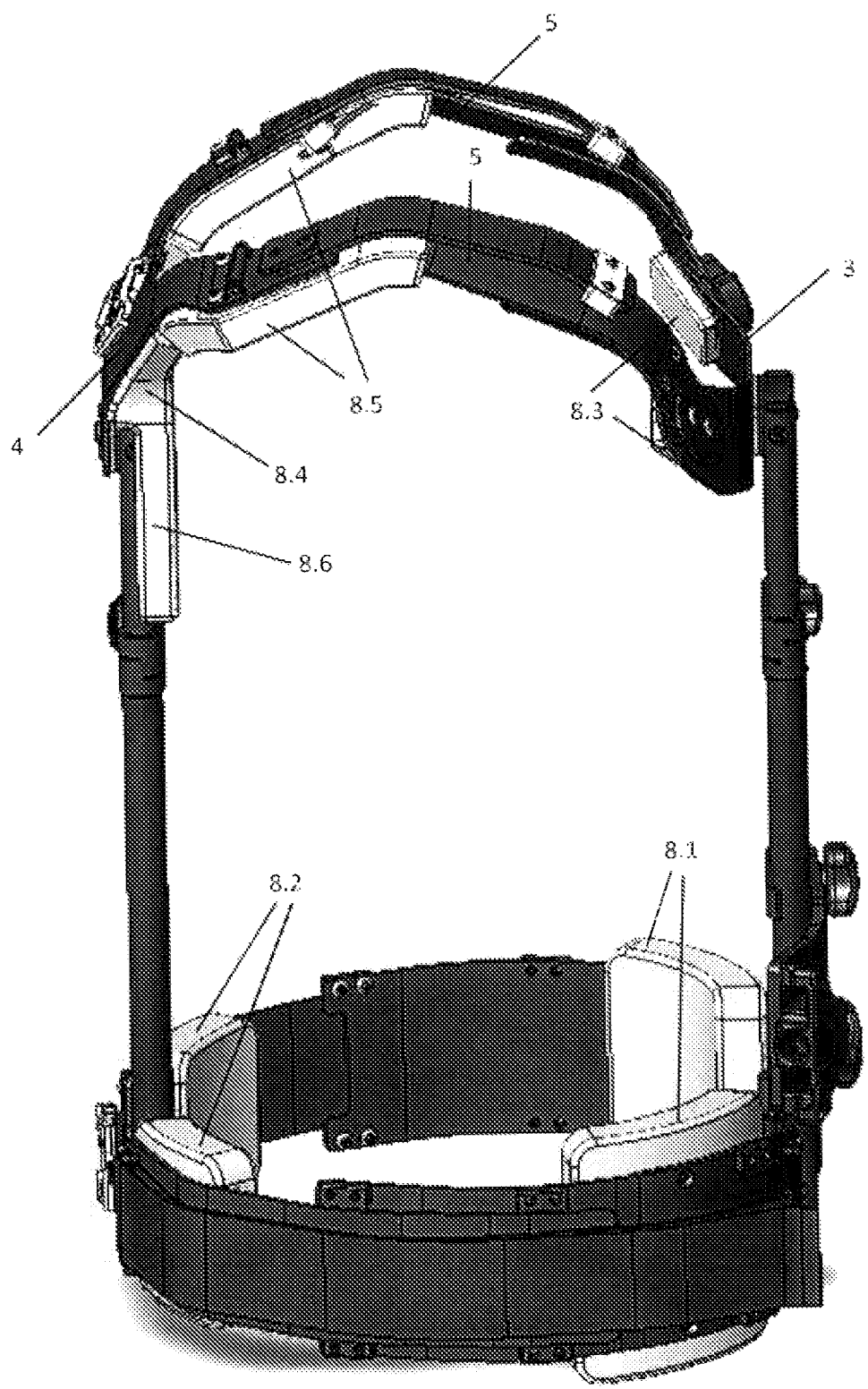

SUPPORT VEST

FIELD OF THE INVENTION

The invention relates generally to products in the form of vests and methods of supporting and using tools, including, but not restricted to, camera stabilizing equipment.

BACKGROUND OF THE INVENTION

Vests or harnesses exist that implement various strategies for load carrying and torque resistance. Shortcomings of existing vests include, for example, tightening around regions of the body in an indiscriminate manner, thereby restricting respiration, circulation, transpiration, and movement. Specifically, they may impinge upon body systems and areas such as the spinal column, the abdomen, the shoulder blades, and certain nerve branches and plexuses.

Existing vests fall into two major categories: front-mount vests, where the load attachment point is to the front, or ventral side of the sagittal plane of the human body; and back-mount vests, where the load attachment point is to the rear, or dorsal side of the sagittal plane. These vests are generally built to transfer the vertical component of the load into the wearer's body, and to resist the torque of suspending a weight anterior to the vest.

Wearers of conventional vests often find pressure is directed to areas where it causes discomfort. Chest straps may restrict natural respiration, and additionally cause the vest to move during respiration, affecting the pitch of the load-carrying attachment point, and interfering with precise operation of the supported equipment. To maintain an appropriate pitch of the load, conventional vests generally cause the wearer to use a modified gait that is contrary to natural human locomotion, and results in diminution of equilibrium and increased muscular effort throughout the entire lower extremity and across the ventral and dorsal abdominal muscles. The loaded vest may also interfere with the natural movement of the entire pectoral girdle, particularly the scapulae, thus restricting the movement of the arms. By encompassing large areas of the wearer's body, the front-mount vest, and to some extent the back-mount vest, reduce transpiration causing additional discomfort.

Accordingly, there is a need for a vest that overcomes or reduces some or all of the shortcomings of existing vests.

SUMMARY OF THE INVENTION

An illustrative embodiment of the invention provides a support vest configured to conform to a wearer's natural movements, allowing forces to be applied to selected areas, and permitting varying attachment points for a supported load. The support vest is rigid in the sagittal plane and flexible in the coronal plane.

According to the illustrative embodiment of the invention, the support vest includes a semi-rigid waistband with a ventral spar member and a dorsal spar member extending upward therefrom. The ventral spar member top (superior) end is attached to a ventral plate. The dorsal spar superior end is attached to a rigid dorsal plate. The ventral plate and the dorsal plate are connected to one another by adjustable, semi-rigid shoulder straps configured to be disposed over a wearer's shoulders. A load can be attached to the support vest via attachment components located ventrally and/or dorsally.

The ventral spar member and the dorsal spar member are attached inferiorly to the waistband through an inferior ventral pivot system and an inferior dorsal pivot system, respectively. The ventral spar member and the dorsal spar member attach superiorly to the ventral plate and dorsal plate respectively, through a superior ventral pivot system and a superior dorsal pivot system, respectively. The pivot systems may include limiting adjustments to limit rotation. The attachment point of the ventral spar member to the ventral plate and the attachment height of the dorsal spar member to the dorsal plate are at substantially the same height.

Additional features of this illustrative embodiment of the invention include extendible and collapsible ventral and dorsal spar members via a length adjustment system, such as a telescoping mechanism. The vertical spar members are extendable ventrally and dorsally to approximately mid-thoracic level and are substantially symmetrical to one another. For many applications, the support vest preferably transmits the bulk of the load into the ilia inferiorly, and the remainder into the trapezius muscle superiorly of the wearer, which can be achieved, at least in part, by these adjustments.

A pad system can add to the comfort of the wearer and further help to distribute forces as desired. In an illustrative embodiment of the invention, dorsal iliac pads are disposed on the interior of the waistband on either side of the attachment area of the dorsal spar member; one or more dorsal-plate pads are disposed on the interior side of the dorsal plate; the dorsal plate pads transition into a pair of shoulder strap pads disposed on the interior side of the shoulder straps; one or more dorsal rod pads are disposed on the interior side of the dorsal spar; ventral iliac pads are disposed on the interior of the waistband on either side of the attachment area of the ventral spar member; and one or more ventral plate pads are disposed on the interior side of the ventral plate. The dorsal and ventral iliac pads preferably adjustable along the waistband. It will be understood that in many cases a single continuous pad can be used in an area or a plurality of pads. The pads can vary in thickness to achieve the desired force distribution.

The support vest preferably has numerous adjustments to achieve the desirable distribution of weight-insertion zones. In addition to adjustments so far described, the load attachment components can be adjustable. Furthermore, the shoulder and waistband straps may have a double-purchase adjustment system, wherein double-purchase strap system is capable of transferring forces from the ventral side of the support vest to the dorsal side. Strap and waistband adjustment systems can include interlocking semi-rigid slides with closure mechanism such as hook and loop materials.

The support vest may include a quick-release system. A dorsal combination hinge and quick-release system is disposed at the superior extent of the dorsal spar member and an inferior dorsal combination hinge and quick-release system is disposed at the inferior extent of the dorsal spar member. The vest can be configured so that both mechanisms can be released substantially simultaneously by functionally connected cords.

DESCRIPTION OF THE DRAWINGS

FIGS. 5A-D depict lower and upper pivot systems according to an illustrative embodiment of the invention.

FIG. 6 depicts rear elevations of a pivot limiting adjustment according to an illustrative embodiment of the invention.

FIG. 8 depicts a pad system according to an illustrative embodiment of the invention.

DETAILED DESCRIPTION OF THE INVENTION

The invention will generally be referred to as an Exovest. As used herein "Exovest" includes various embodiments of the invention. The Exovest will also be referred to as a support vest or exoskeletal structure. An illustrative embodiment of the invention will now be described.

Instead of indiscriminately tightening around, and interfering with, various regions and systems of the human body, an exemplary Exovest transfers its load and torque into anatomically suitable regions that are better able to resist such weights and forces and to transfer them appropriately throughout natural bodily load-carrying systems. Additionally, the Exovest interferes relatively minimally with respiration, circulation, transpiration, and movement, including locomotion.

The Exovest fits a flexible exoskeletal structure around the human frame that generally conforms to the body's natural movements, allowing forces to be applied to selected areas, and permitting varying attachment points for the supported load.

Figure 1:
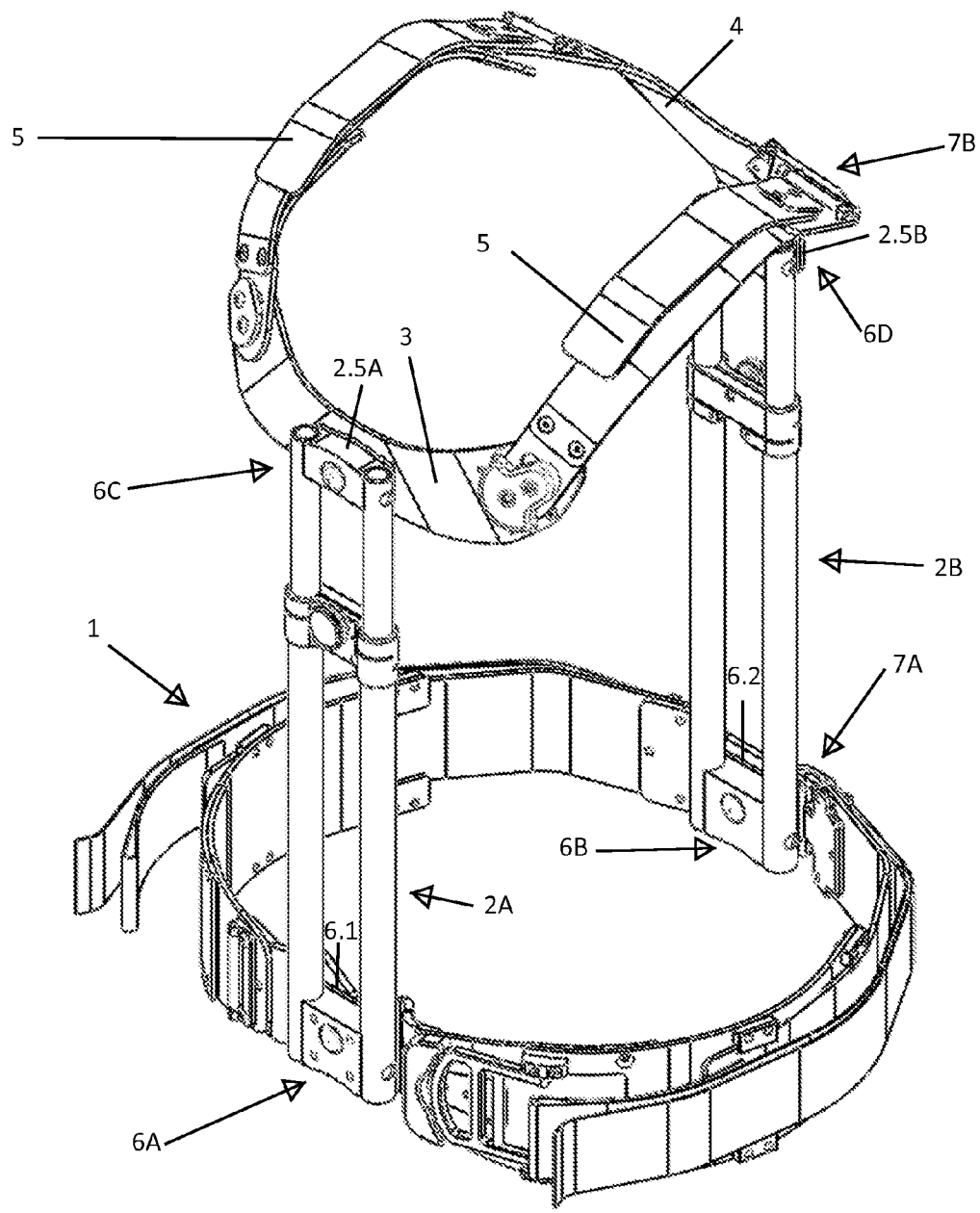
FIG. 1 depicts a support vest according to an illustrative embodiment of the invention.

FIG. 1 depicts an Exovest according to an illustrative embodiment of the invention. In place of the waistbands entirely encompassing the pelvis, common to all current vests, the Exovest uses a semi-rigid waistband 1, preferably about one hand-breadth wide (approximately four inches), that supports two separate pad systems (described in more detail below) that rest on and around the iliac crests of the pelvic girdle, avoiding the abdominal region ventrally, and the sacral region dorsally. Because the femoral bones of the lower extremity insert directly into the ilea, the iliac crests are ideal locations to place a load that is to be transferred through the lower extremity into the ground. Allowing the load to be placed indiscriminately into the abdomen can cause intestinal discomfort. Allowing the load to be applied to the sacral region of the spine may cause spinal nerve plexuses to be compressed, and may also cause unnecessary strain to be placed on the sacro-iliac joint. Allowing load to be placed laterally on the gluteus medius muscles may restrict natural movement of the hip joints. Illustrative embodiments of the Exovest avoid some or all of these issues by directing the load into anatomically suitable regions, and limiting direction of loads into anatomically unsuitable ones.

Additionally, a pad system can be incorporated, for example including pads to avoid compressing the gluteus muscles laterally so interference by the system with the actions of these muscles upon the hip joints when walking can be reduced or eliminated.

Rising from the waistband 1, both ventrally and dorsally are vertical spar members, which may take various forms, but in the illustrated design are represented by two sets of preferably substantially parallel rods 2A, 2B that can be extendible and collapsible to accommodate differing torso lengths. Parallel rod pairs 2A, 2B extend upward from the ventral and dorsal sides of waistband 1. A single extendable member or other vertical spar form can be used provided it can accommodate differing torso lengths. In the case of the front-mount vest, these replace the solid vertical spar generally used, and by virtue of their paired rods, may offer a lighter and stronger attachment point on the front of the Exovest. The rods may offer a greater range of vertical attachment than does the currently used front-mount vest. In the case of the back-mount vest, the dorsal rods replace the dorsal spar, and may offer a similarly enhanced range of attachment possibilities.

"Vertical" and "horizontal" are used herein as generally relative terms to one another and not to specific positions. As one will understand, the position of the vest and its components will not necessarily correspond to the horizon and a normal to the horizon.

The rod systems rise ventrally and dorsally to approximately mid-thoracic level. Their spacing (for example, four fingers' breadth spacing—approximately four inches) may allow them ventrally to pass comfortably between breasts of any size, and dorsally to avoid some or all contact with the spinal vertebrae, and to pass between the scapulae without impinging upon them or their natural movement. Ventrally, the superior extent of the rod system joins to a ventral plate 3, about three fingers (approximately three inches) tall that lies just inferior to the claviculae, and extends substantially horizontally on the sagittal plane to a distance just wide enough to allow a semi-rigid strap system to cross over the shoulders. Dorsally, the superior extent of the rod system joins to a rigid dorsal plate 4, substantially the same height as the ventral plate 3 that separates into two elements that curve upwards around the scapulae to a height and a distance suitable to engage a semi-rigid strap system crossing from the ventral plate 3.

On crossing over the shoulders, the shoulder straps 5 are preferably designed with enough adjustability to allow them to pass comfortably between the sternocleidomastoid muscles of the neck and the acromioclavicular joint of the shoulder, allowing their associated optional, but recommended, pad systems to rest solely on the superior regions of the trapezius muscles. Pressure on the sternocleidomastoid muscles can restrict neck movement, cause discomfort, and in extremis, reduce blood circulation. Pressure on the acromioclavicular joint can cause discomfort and restrict shoulder movement. The sole bony connection between the upper extremity and the torso is where the claviculae attaches to the scapulae via the acromioclavicular joint. Because weight carried in the hands, and the resulting torque of suspending this weight out front, is transmitted to the rest of the body only minimally by means of this joint, but maximally by means of the scapulae which are embedded within the twin wedges of the trapezius muscles, this makes the upper trapezius a preferable area into which to transfer weight, providing that the natural movement of the scapulae, and the pectoral girdle, is not restricted by such placement.

Figure 9:
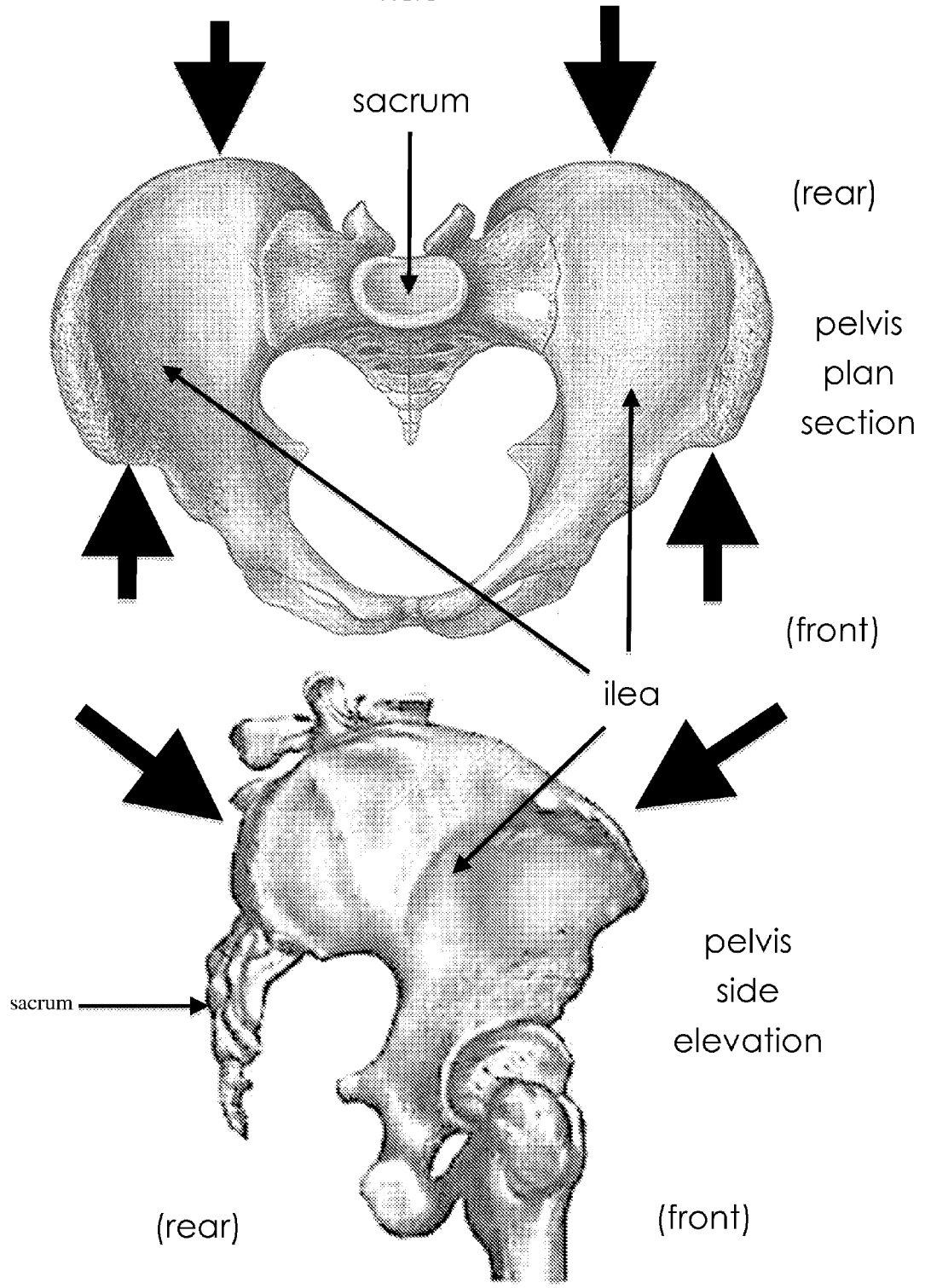
FIG. 9 shows weight insertion zones associated with a vest according to an illustrative embodiment of the invention.
Figure 10:
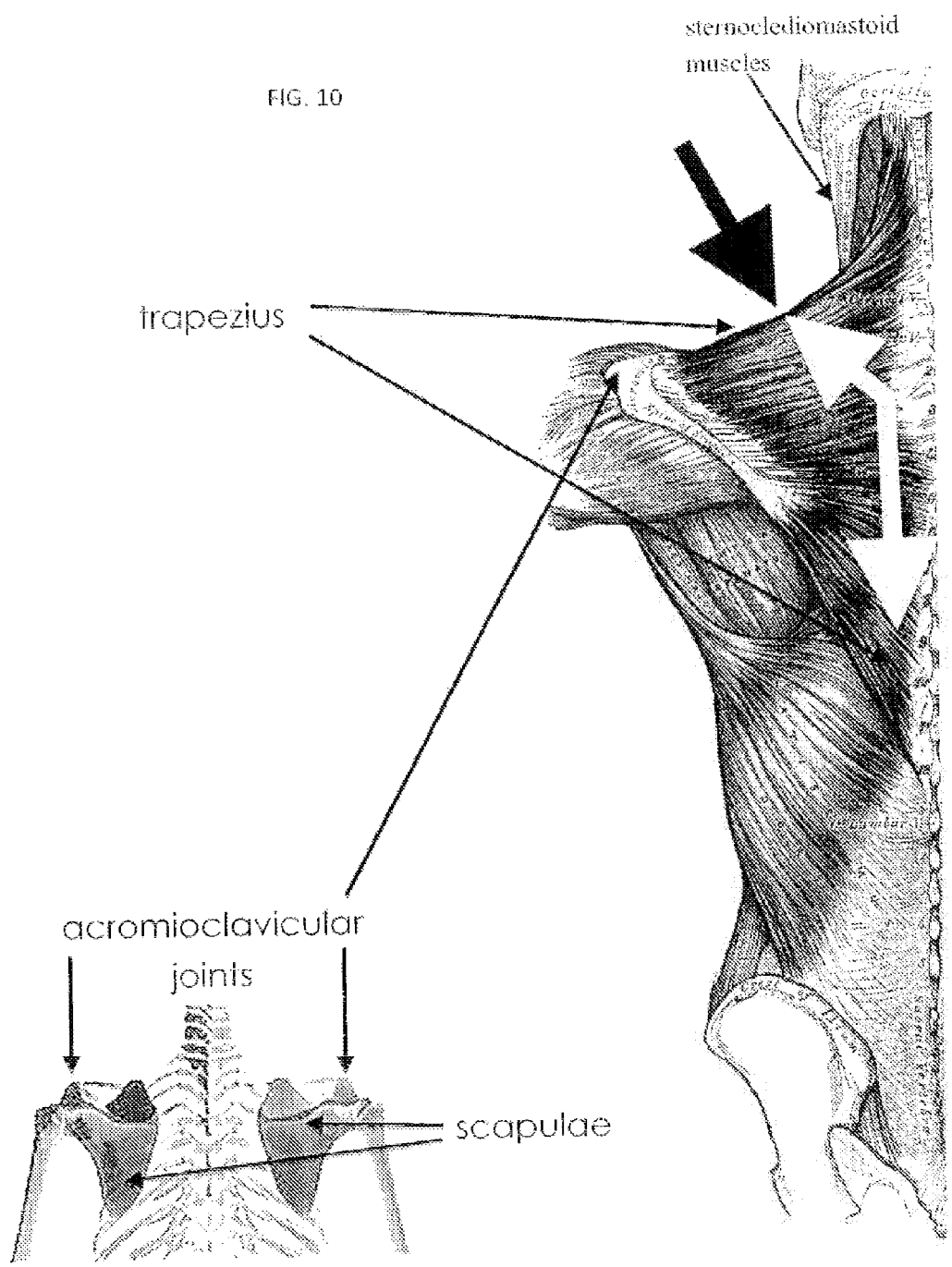
FIG. 10 depicts weight application zones and torque application zones associated with a vest according to an illustrative embodiment of the invention.

Thus, the Exovest preferably transmits the bulk of the load into the ilia inferiorly, and the remainder into the trapezius muscle superiorly. This is shown in FIGS. 9 and 10 by the bold solid black arrows. The bold white arrows in FIG. 10 represent the torque application zone. This configuration allows the Exovest to resist the torque of a weight carried anteriorly to the wearer. Both the front and back-mount vests resist the aforementioned torque by means of their structures constituting a lever from the waistband to mid-thoracic level (represented by the chest straps of the front-mount vest, and by the dorsal spar of the back-mount vest). The Exovest can be designed to extend and approximately double this lever arm to the height of the upper trapezius, thus possibly reducing local compressive forces on the body.

FIG. 8 depicts a pad system according to an illustrative embodiment of the invention. Padding, including dorsal iliac pads 8.2, dorsal-plate pad 8.4 and dorsal rod pads 8.6, is attached to the dorsal rod system such that it may comfortably engage the twin rows of the erector spinae muscle system then run along either side of the spinal column. Superior to the rod system, the padding attaches to the dorsal plate 4, and engages with the trapezius muscles medial to the scapulae, preferably without touching either the scapulae or the spinal column, and transitions into the shoulder straps 5 that engage with the superior regions of the trapezius muscles as the straps 5 cross over the shoulders to join with the ventral region of the vest. Torque is resisted in this illustrative embodiment without significantly inhibiting breathing, as with the front-mount vest, and without significantly loading the thoracic vertebrae, as with the back-mount vest. The trapezius muscles are a desirable placement area for torque resistance, provided that the natural movement of the scapulae, and the pectoral girdle, is not substantially restricted by such placement. Additional padding is provided, including ventral iliac pads 8.1, ventral plate pads 8.3 and shoulder strap pads 8.5.

Figure 11:
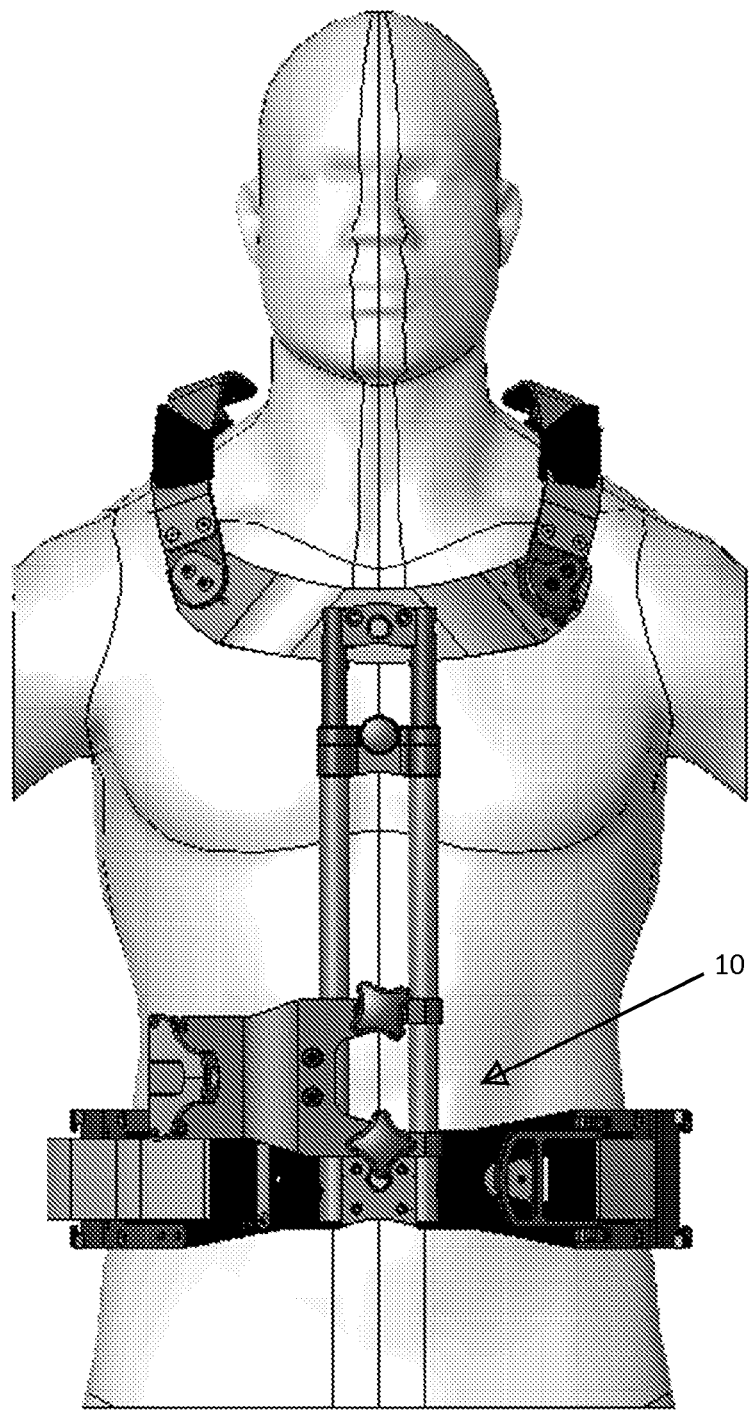
FIG. 11 depicts a vest with a ventral load attachment point according to an illustration embodiment of the invention.
Figure 12:
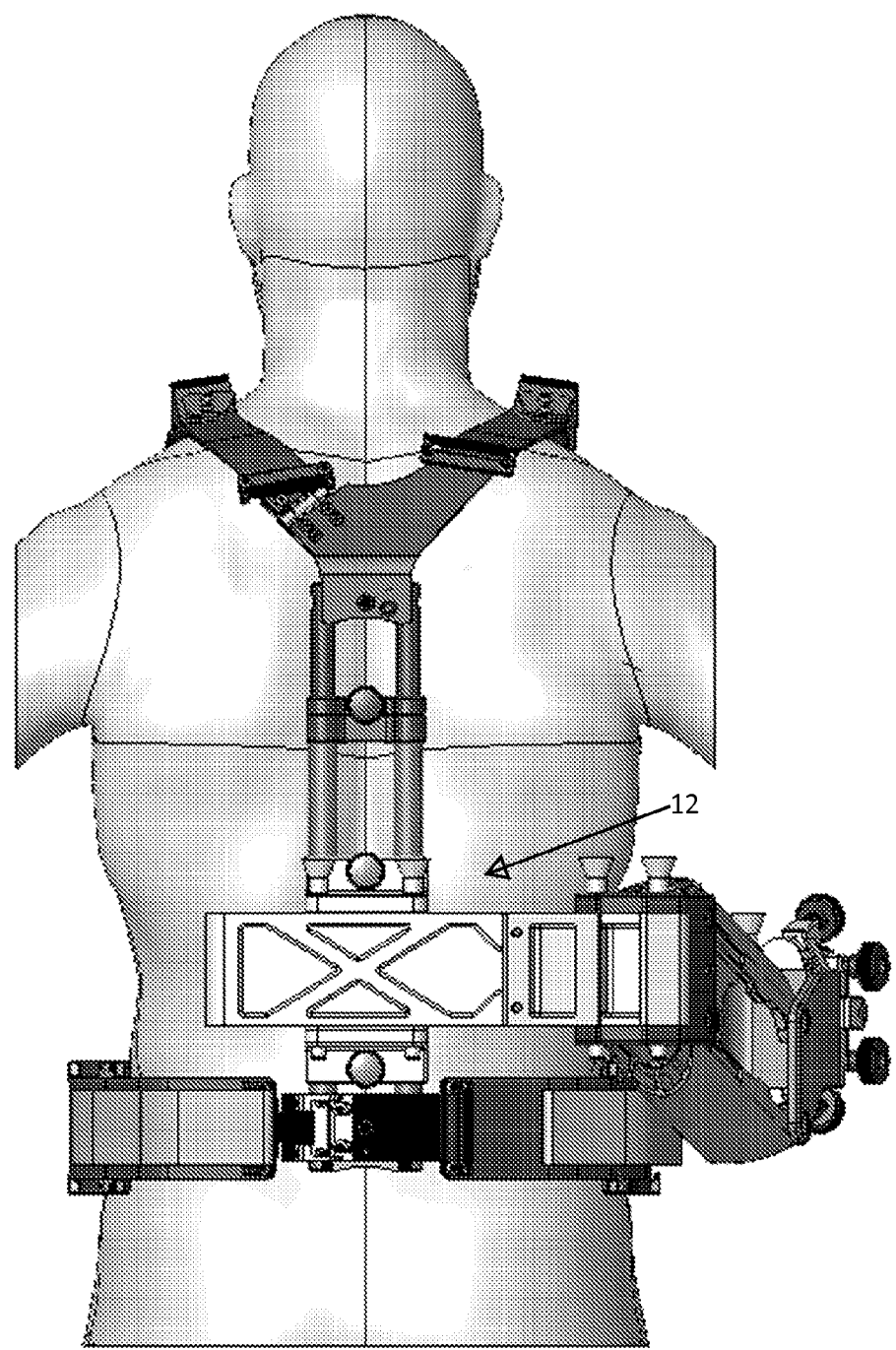
FIG. 12 depicts a vest with a dorsal load attachment point according to an illustration embodiment of the invention.

FIGS. 11 and 12 depict Exovests with ventral and dorsal load attachment points 10, 12, respectively, according to illustration embodiments of the invention. Because the Exovest is rigid in the sagittal plane, and the spar systems substantially symmetrical ventrally and dorsally, the placement point for the attachment of the load may be either ventral or dorsal. Accordingly, the Exovest has attachment possibilities of the front-mount vest and the back mount-vest, but with possibly greater range in the case of the front-mount vest because the front spar can eliminate the need for a chest-strap connection, thus freeing up vertical range. Attachment points may be selectable to precisely suit the current application, without being predetermined by the model of vest. This interlocking system can result in a vest that is capable of transferring a load, irrespective of where it is attached, into the suitable and comfortable anatomical regions of the body. Torque experienced by the placement of a load anterior to the wearer's center of gravity is transferred, irrespective of where the load is attached, into the regions of the body well suited to resisting that torque.

Although rigid in the sagittal plane where it needs to resist load and torque, the Exovest is flexible in the coronal plane. The spar systems, ventral and dorsal, attach inferiorly to the waistband through pivoting systems 6A, 6B, respectively, (which may be free, frictional, limited, or self-centering). Superiorly, they also attach to the ventral plate 3 and dorsal plate 4 by pivot systems 6C, 6D, respectively, that can generally be lighter. In conventional vests, any movement of the pelvis generated by normal locomotion is transmitted into the load-carrying attachment point, changing its pitch and interfering with precise operation of the supported equipment. Especially in the case of the back-mount vest, this effect causes the wearer to adopt an unnatural gait that is inefficient and tiring. In the Exovest, natural movements of the pelvic girdle generated by walking or climbing stairs are accommodated, at least in part, by the pivots, allowing the vertical rod systems that form the load-attachment points to remain in place on the wearer's body. When carrying equipment and operating it precisely while walking, this system may allow for reduced muscular effort on the part of the operator, and therefore, may enable a higher degree of balance and stability. Similarly, the upper pivots allow for the natural movements of the pectoral girdle and the upper extremities without interfering, or reducing interference, with the pitch of the spar systems and their load-carrying attachment points.

These pivots work around two axes, the lower of which corresponds to the rotation of the pelvic girdle while walking, the upper of which corresponds to the rotation of the shoulder girdle when one arm is moved to a different height relative to the other. The lower pivot system minimizes the rise and fall of any tool-attachment superior to the waistband, by allowing that point to remain at a more constant level while walking.

The Exovest can be designed to be lighter than the related art, and thus more comfortable to wear. It preferably engages the wearer only in anatomically suitable places, so as not to impinge indiscriminately on unsuitable places. Ideally, the Exovest conforms to and moves with the wearer's natural movements, including respiration, which may reduce fatigue, and increase possible wearing time. Additionally, the vest may not need to be tightened to the same degree as in the related art. Both conventional front and back-mount vests must be tightened to a great degree to ensure that when the supported load is shifted anteriorly, the vest is ready to resist the resulting torque. In the case of the Exovest, due to the preferred rigid nature of the structure, and the relatively long lever arm, the torque-resisting potential may be greater compared to conventional vests. As the load moves anteriorly from the wearer, the torque-resisting lever beds into the muscle systems of the upper back. When the anterior extension of the load is decreased, the pressure is accordingly reduced or removed from those muscle systems.

The Exovest may also be readily adjusted while under load by means of a single or multiple-purchase shoulder and waistband straps (detailed below) that enable the wearer to tune how the load is transmitted into the body. For example, the shoulder straps may be relaxed such that all of the vertical load is placed onto the hips, or may be tightened to shift some of that load into the shoulders, to suit personal preference or differing operational circumstances.

Various components of the Exovest will now be described in more detail.

Waistband

Figure 2:
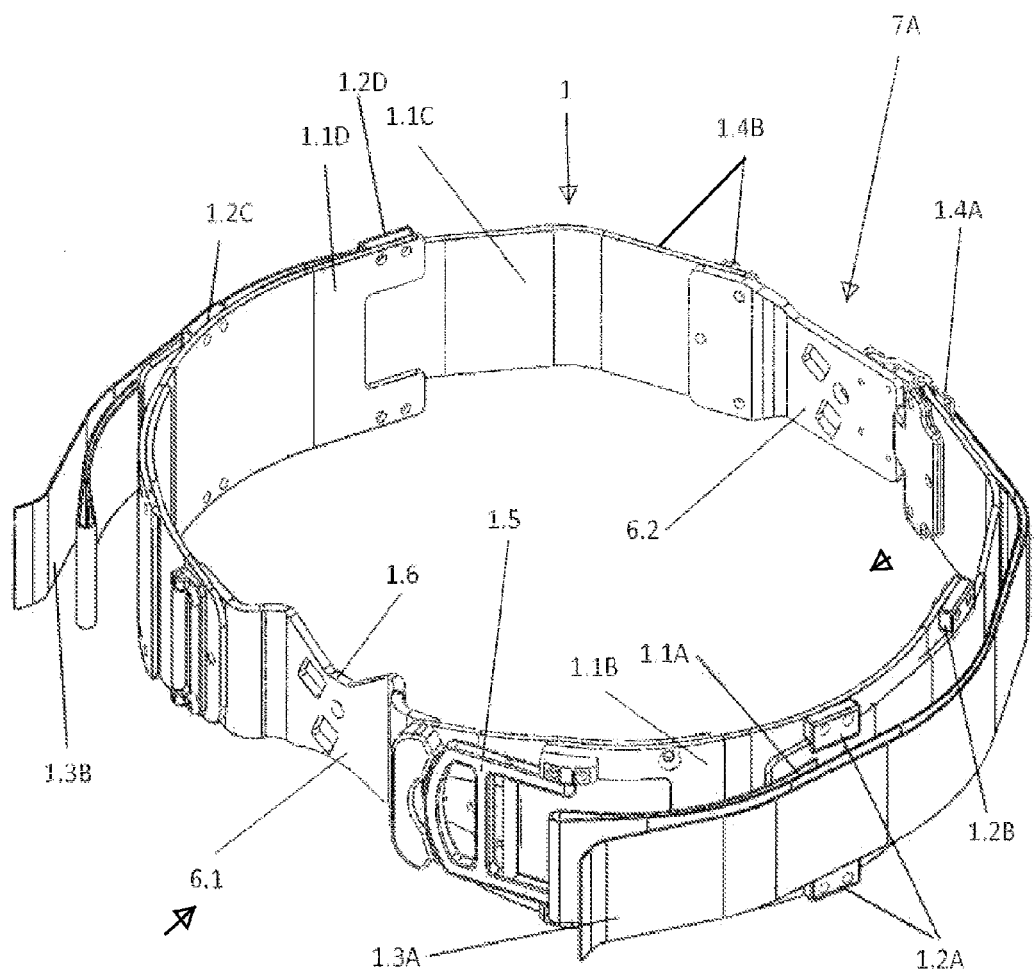
FIG. 2 depicts a waistband isometric according to an illustrative embodiment of the invention.

FIG. 2 depicts a waistband isometric according to an illustrative embodiment of the invention. The waistband 1 adjusts to accommodate various girths of wearer by means of a system of interlocking components to provide a suitable fit. On each side, left and right, run a number of interlocking semi-rigid slides. Each interlocking section comprises a pair of slides, identified in FIG. 2 as parts 1.1A, 1.1B and 1.1C, 1.1D. In the case of the illustrated design, slide 1.1A overlaps slide 1.1B and slide 1.1C overlaps slide 1.1D. One slide of each pair (1.1B, 1.1D) is attached to the vest front, and the other slide of the pair (1.1A, 1.1C) is attached to the vest back. Slides 1.1A, 1.1C are held in relation to slides 1.1B, 1.1D, respectively by paired sets of guides 1.2A, 1.2B and 1.2C, 1.2D (only partially shown). Exterior to the slides 1.2A-D runs Velcro bands 1.3A-B that are attached to slides 1.1A, 1.1C at the front, and run through rollers 1.4A, 1.4B, respectively, which are attached to the second slide of each pair 1.1B, 1.D, respectively, at the rear. These bands then loop back over themselves and Velcro tag to themselves at the front. Other suitable adjustable closure mechanisms may also be used. This multiple-purchase system allows, for example, for a 2:1 mechanical advantage when adjusting the fit of the vest, such that the vest need not be removed and readjusted to achieve tightening.

This interlocking system provides for a waistband that is both adjustable and rigid enough to be capable of transferring weight from the ventral side of the vest to the dorsal side, or vice-versa, depending on which side the load-attachment point is placed.

The waistband 1 is equipped on one side with an over-center lever 1.5, here shown on the left side of the vest, which is provided to allow the operator to quickly relax the tension of the waistband when the vest is not loaded. The waistband 1 is then returned to optimal tightness by returning the lever to its closed position. On the side of the vest corresponding to the over-center lever, the dorsal extent of the Velcro band attaches to a bail on the lever itself to enable the over-center purchase.

On one side of the waistband, here shown on the left side of the vest, is a conventional latch system comprising wedged dovetail plates 1.6 that interlock securely and rigidly to maintain vest stability, but allow easy ingress to and egress from the vest.

Built into the waistband 1, on one side only, here shown on the left side of the vest, is a unique combination hinge/quick-release system 7, which in normal operation acts as a hinge that works together with the dovetail latch 1.6 to allow ingress to and egress from the vest, but doubles as an emergency quick-release system in circumstances where the wearer has to jettison the vest and entire supported load with extreme rapidity. This is depicted in more detail in FIGS. 7A-F. Other quick release mechanisms compatible with the waistband 1 are within the scope of the invention.

FIG. 8 depicts a pad system according to an illustrative embodiment of the invention. Interior to the semi-rigid slides 1.1 are two sets of preferably moveable foam pads that are placed to transfer the weight into the wearer's body. Two front pads 8.1, as shown in FIG. 8, are placed on either side of the abdomen, applying their transmitted weight directly into the ilea, as indicated in FIG. 9 by bold arrows. Two rear pads 8.2 are placed on the ilea on either side of the sacrum as shown in FIG. 8. In this way, loading is diverted from the abdomen and the sacrum (the base of the spine) and also from the gluteus medius muscles. That there exists a gap between the front and rear pad systems allows for the waistband to be tightened front-rear, with minimal loading on the gluteus muscles at the sides. This has two advantages. First, direct front-rear tightening via the semi-rigid waistband enables weight to be transferred into the lower back, and second, leaving a gap may allow for better blood circulation, since the waistband may not be pressing continuously around the body.

Ventral and Dorsal Rod Systems

Figure 3:
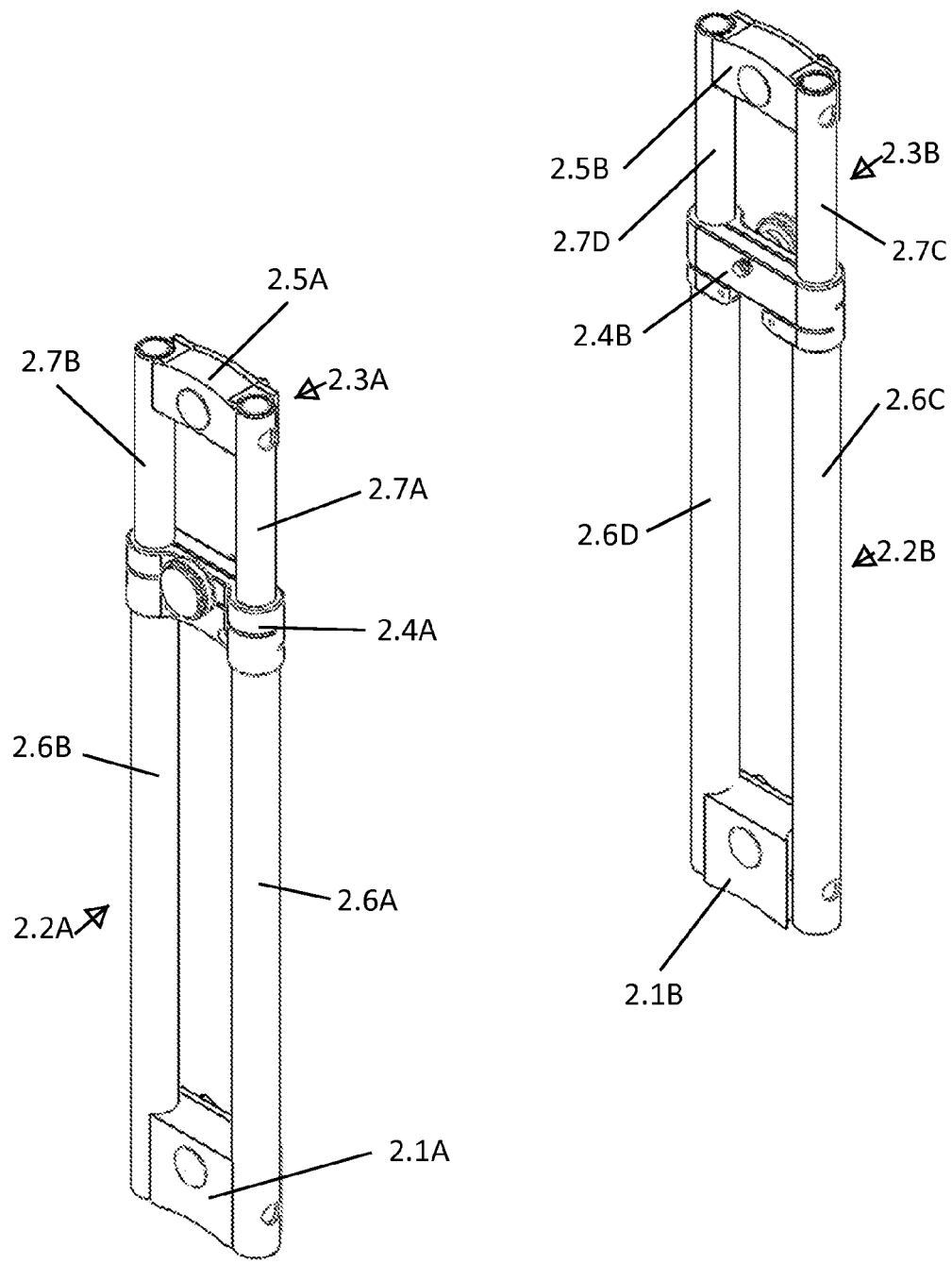
FIG. 3 depicts ventral and dorsal rod systems according to an illustrative embodiment of the invention.

FIG. 3 depicts ventral and dorsal rod systems according to an illustrative embodiment of the invention. Rising from the waistband 1 attachment points on the lower rod spacers 2.1A, 2.1B, ventrally and dorsally, respectively, are two vertical rod systems 2.2A, 2.2B (which may otherwise comprise any vertical spar system) that interlock superiorly in a telescoping system, to two sets of smaller vertical rods 2.3A, 2.3B, by means of locking clamps 2.4A, 2.4B. Vertical rod system 2.2A comprises rods 2.6A, 2.6B into which rods 2.7A, 2.7B telescope, respectively. Vertical rod system 2.2B comprises rods 2.6C and 2.6D, into which rods 2.7C and 2.7D telescope, respectively. The upper sections terminate ventrally at the upper rod spacers 2.5A, 2.5B where they attach ventrally to the ventral plate 3, and dorsally to the dorsal plate 4 (See FIG. 1).

These vertical spar systems offer a vertical range of attachment points, and unlike other systems known to the inventors can offer a range of both ventral and dorsal attachment points. This narrow vertical spar system avoids or minimizes contact with the female breasts, and the scapulae. Specifically, the dual-rod system offers increased strength and lightness, and greater comfort compared to various conventional designs. Rounded edges of the rods can increase comfort as compared to a flat plate, and dorsally, will generally not impinge directly upon the spine, but upon the twin rows of the erector spinae and trapezius muscles that run either side of it. Additionally, the dual-rod system ensures that both the centre-line of the sternum and the spinal column are open to ventilation to allow transpiration in areas prone to sweating.

Ventral Plate, Dorsal Plate, & Shoulder Straps

Figure 4:
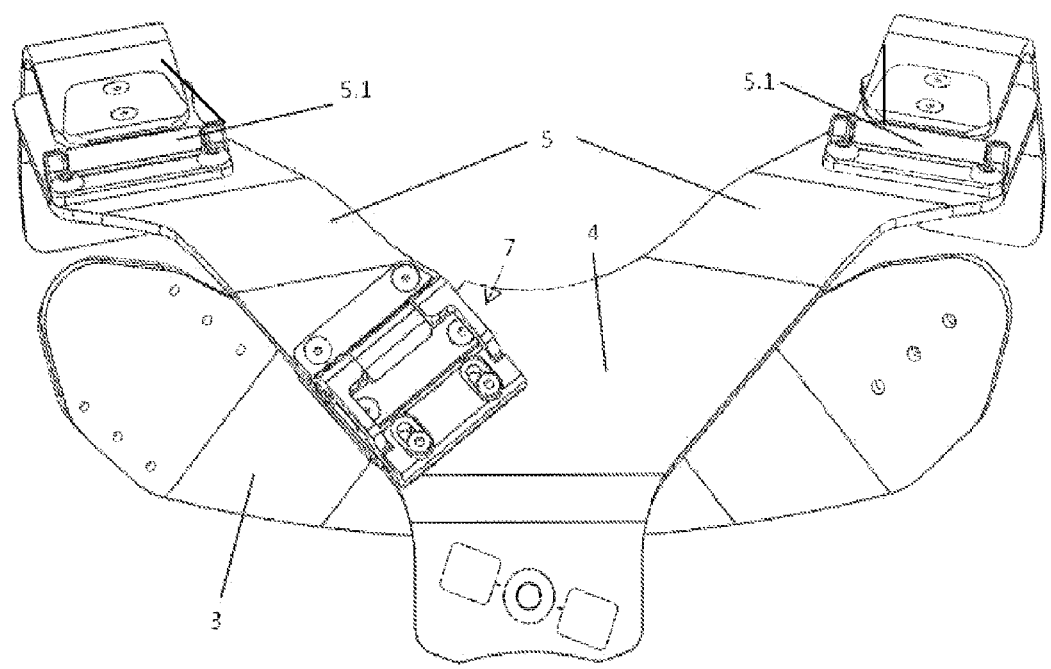
FIG. 4 is a rear elevation of the ventral plate 3, the dorsal plate 4 and the shoulder straps 5 according to an illustrative embodiment of the invention.

FIG. 4 is a rear elevation of the ventral plate 3, the dorsal plate 4 and the shoulder straps 5 according to an illustrative embodiment of the invention. Each vertical spar system connects superiorly to its associated plate 3, 4. Ventrally, the ventral plate 3 comprises a thin plate just wide enough (on the coronal plane) to allow the shoulder straps 5 to rise from its (left and right) extremities on the sagittal plane to pass relatively comfortably over the shoulders, and of about two inches vertical depth. The ventral vertical spar system is preferably adjusted to a height such that the superior extent of the ventral plate 3 lies just inferior to the claviculae, thus avoiding, or reducing, contact with them and allowing relatively uninhibited movement of the pectoral girdle.

Interior to the ventral plate 4 are placed thin cushioning pads 8.3 (see FIG. 8) that are not intended for load-bearing purposes, but to protect the wearer from occasional contact with the ventral plate 3.

Dorsal Plate

Dorsally, the dorsal vertical spar system, which includes parallel rod pair 2B, connects superiorly to the dorsal plate 4, which inferiorly is preferably the same width (on the coronal plane) as the spar system itself, but separates into two separate elements of about two inches width that curve around the scapulae and then rise vertically to connect with the shoulder straps 5. FIG. 4 depicts dorsal plate 4 flaring out to the two separate elements that extend over the shoulders. This flared configured can be more comfortable than a more angular design. The dorsal vertical spar system is preferably adjusted to a height that allows the superior extent of the dorsal plate 4 to terminate just inferiorly to the superior extent of the trapezius where that muscle system passes over the shoulder.

FIGS. 7A-F depict a unique combination hinge/quick-release system 7 built into the dorsal plate 4 on its left-hand side according to an illustrative embodiment of the invention, which in normal operation acts as a hinge to allow easy ingress to and egress from the vest, but doubles as an emergency quick-release system in circumstances where the wearer has to jettison the vest and entire supported load with extreme rapidity. The hinge/quick-release system 7 will be described in more detail below.

Interior to the dorsal plate 4 sit two pad systems 8.4, 8.5, 8.6 that engage the trapezius muscles running along either side of the spine, as shown in FIG. 8. Preferably the pads are positioned as follows: on the coronal plane they terminate medially to the scapulae, so as not to impinge upon the natural movement of the pectoral girdle. The gap between the pad systems allows the pads to bridge the vertebral column without touching it. Thus the spine is not directly interfered with mechanically, and the region may transpire freely. This pad system transmits the bulk of the torque produced by supporting a load anterior to the wearer into the trapezius muscles.

Superiorly, pads continue past the upper extent of the dorsal plate 4 to lie interior to the shoulder straps 5 as they cross over the shoulders. See pads 8.4 and 8.5 in FIG. 8. Inferiorly to the dorsal plate 4, the pads may optionally transition into two short vertical pads 8.6 that descend to lie interior to the dorsal vertical spar system so as to support the dorsal spars 2B, and to prevent it from coming into direct contact with the back. As with the dorsal plate pads 8.5, these dorsal pads 8.6 bridge the spine, and apply their forces into the inferior regions on the trapezius, and the superior regions of the erector spinae muscles. The dorsal pad system preferably leaves the spinal column open to ventilation to allow transpiration.

Shoulder Straps

As shown in FIG. 4, joining the ventral plate 3 to the dorsal plate 4 superiorly run two sets (left and right) of semi-rigid shoulder straps 5, each set having a strap extending from the dorsal plate 4 and a strap extending from the ventral plate 3. The former straps include, ventrally, two short rigid adjustment plates 5.1 of about two inches width whose inferior connections to the ventral plate 3 permit adjustment in the coronal plane to accommodate differing shoulder widths. These adjustment plates 5.1 run superiorly to the height of the dorsal plates' superior termination, just inferior to the superior extent of the trapezius where that muscle system passes over the shoulder. Running from the superior extent of these adjustment plates 5.1 to the dorsal plate 4 is a system analogous to the waistband-adjustment system described previously. On each side, left and right, run a number of interlocking semi-rigid slides analogous to 1.1 shown in FIG. 2, in the case of the illustrated design, two slides of about three fingers' width (one attached ventrally to the adjustment plates, the other directly to the dorsal plate) that lie over one another, and are held in relation to each other by paired sets of guides, analogous to 1.2 in FIG. 2. These semi-rigid slides connect dorsally to the superior region of the dorsal plate by a connection that permits adjustment in the coronal plane to accommodate differing shoulder widths.

Exterior to these slides runs a Velcro band that is attached to the adjustment plate 5.1 at the front, and runs through a roller (not shown), analogous to 1.4 in FIG. 2, attached to the slide at the rear. This band then loops back over itself and Velcro tags to itself at the front, in a similar manner as the Velcro band 1.3 of the waistband 1 does in FIG. 2. This double-purchase system allows for a 2:1 mechanical advantage when adjusting the fit of the vest, such that the vest need not be removed and readjusted to achieve optimal tightening.

Because the length of the semi-rigid sections of the shoulder straps is kept to a minimum, and because they pass almost horizontally over the shoulders, this interlocking system provides for shoulder straps that are both adjustable and rigid enough to be capable of transferring forces from the ventral side of the vest to the dorsal side, or vice-versa, depending on which side the load-attachment point is placed.

On one adjustment plate 5.1, is a conventional latch system, analogous to the waistband latch 1.6, comprising wedged dovetail plates that interlock securely and rigidly to maintain vest stability, but allow easy ingress to and egress from the vest in combination with the hinge/quick-release system 7.

The pad system rising from the dorsal plate 4 continues beyond the superior extent of the dorsal plate 4 to lie interior to the shoulder straps 5, such as shown by reference number 8.5 in FIG. 8. Thus, some of the weight of the attached load may be placed vertically into the trapezius muscles as they cross over the shoulder, so as to stabilize the vest on the wearer's body. By use of the double-purchase Velcro strap, this load may be tuned, even under load, to suit varying circumstances.

Other adjustable mechanisms may take the place of the Velcro straps where used in the embodiments described, provided they offer an analogous function.

Lower and Upper Pivot Systems

FIGS. 5A-D depict lower and upper pivot systems according to an illustrative embodiment of the invention. The waistband 1 connects ventrally and dorsally to the spar systems via two rigid plates 6.1, 6.2, respectively, that serve to direct load-bearing and torque forces away from the abdomen ventrally, and load-bearing forces away from the sacrum dorsally, and into the ilea. (See also FIG. 2.)

The abdominal ventrally located pivot plate 6.1 forms much of the ventral rigid section of the waistband. Laterally, it attaches on one side to the semi-rigid slide system 1.1B via the wedged dovetail plates 1.6. On the opposite side laterally, it attaches directly to the semi-rigid slide system 1.1D.

The sacral pivot plate 6.2 forms much of the ventral rigid section of the waistband 1. Laterally, it attaches on one side to the semi-rigid slide system 1.1A via the hinge/emergency quick-release system 7. On the opposite side laterally, it attaches directly to the semi-rigid slide system 1.1C.

A single load-bearing axle 6.5, passing through a bushing or bearing, connects the abdominal plate 6.1 and the sacral plate 6.2 to their associated vertical spar systems. In the design illustrated, the spars are portrayed by dual rod systems joined and held in precise relation to each other by lower rod spacers 2.1A, 2.1B (see also FIG. 3), and it is into these spacers, in the design illustrated, that the load-bearing axle inserts. This allows the spar systems to pivot in the sagittal plane with respect to their associated plates. The lower pivot system is designed to allow for natural human movement, and to conform to the geometrical excursions occurring within the human frame during walking and climbing, and to ensure that the vertical load-attachment points are isolated, to a very great extent, from these movements.

Superiorly, the vertical spar systems connect ventrally to the inferior extent of ventral plate 3 and dorsally to the inferior extent of the dorsal plate 4. In the illustrations, these pivots are shown as having a lesser load-bearing capacity than their abdominal and sacral counterparts, and their corresponding parts are represented as upper rod spacers 2.5A, 2.5B and upper plates 6.4 connected by a single load-bearing axle 6.5, passing through a bushing or bearing. As with the lower pivot system, the upper pivot system is designed to allow for natural human movement, and to conform to the geometrical excursions occurring within the human frame during arm movement and shoulder rotation.

Other lower and upper pivot systems may be used provided they impart the functionality as described above.

Pivot Limiting Adjustment

FIG. 6 depicts a pivot limiting adjustment according to an illustrative embodiment of the invention. By means of a limiting system which preferably may comprise one or more shafts or members 6.6 projecting from the rod spacers 2.1A, 2.1B, into outsize cavities in the abdominal plate 6.1 and sacral pivot plate 6.2 (or vice-versa), or any other compatible method of limiting rotation, the lower pivots 6A, 6B (see FIG. 1) are limited to a certain number of degrees in each direction corresponding to the natural rotation of the pelvic girdle about the sagittal plane in normal human locomotion. The system has built-in stops that limit this rotation such that when the wearer's weight rests on one leg, and the pelvic girdle is relaxed and tilted maximally in one direction about the sagittal plane, that the pivot reaches its furthest extent and is locked. This maintains the relationship between flexibility and rigidity in the vest.

To accommodate the differences in anatomical geometry between individuals, and between males and females, this limit may be adjusted by varying the size of the bolts or members inserting into the outsize cavities, by varying the size of the outsize cavities, or by any other practical means. The limiting system may also be quickly-adjustable by means of rotating the hexagonal insert to present a different facet of its surface to the outsize hole (as shown in FIG. 6 by part 6.6, where a pair of eccentric hexagonal inserts may preferably offer three discrete adjustments) or by tightening a conical-section member into an outsized conical-section cavity. A close-up of eccentric hexagonal insert 6.6 is also shown in FIG. 6, which provides an illustrative example of suitable dimensions. The nominal pivot limit is envisaged as plus or minus approximately 3 degrees of rotation, six degrees in total. In the illustration, a lower plate 6.3 is shown as one possible means of providing a low-frictional bearing, which is extended laterally in each direction to maximize the bearing surface in order to increase structural stability. Plates 6.3 and 6.4 can be made of any material compatible with the system and that provides the functionality described or desired. An acetal polymer, such as Delrin®, is an example of a suitable material.

Superiorly, the vertical spar systems connect ventrally to the inferior extent of ventral plate 3 and dorsally to the inferior extent of the dorsal plate 4. The same limited pivoting system applies, and is identified as 6C, 6D in FIG. 1. As with the lower pivot system 6A, 6B, the nominal pivot limit is envisaged as being plus or minus approximately 3 degrees of rotation, six degrees in total.

This combination of features allows for the vest to be substantially rigid in its load-bearing, and torque-resisting capacities, yet to conform to natural human movements, and to ensure that its load-attachment points are isolated, to a very great extent, from these movements.

Hinge/Emergency Quick-Release System

FIGS. 7A-F depict a combination hinge and quick-release mechanism according to an illustrative embodiment of the invention. To enable ingress to and egress from the vest, both in normal circumstances and in emergencies, the Exovest employs a unique and novel combination of hinge and emergency quick-release 7. As shown in FIG. 1, on one or other coronal side of the vest are placed two hinges 7A, 7B, one (7B) superiorly on the dorsal plate 4 (7B), just inferior to its point of connection to one shoulder strap, and one (7A) inferiorly on the sacral plate 6.2 just medial to its connection to the waistband 1. In the illustrated design, both hinges are placed on the left side of the vest.

Figure 7A:
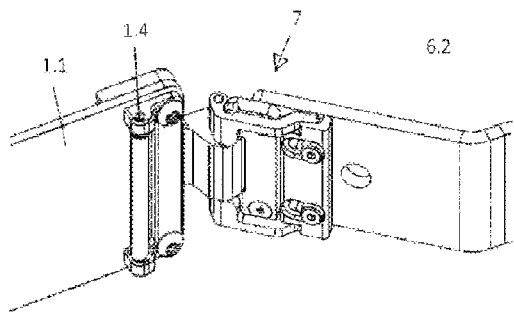
FIGS. 7A-F depict a combination hinge and quick-release mechanism according to an illustrative embodiment of the invention.
Figure 7B:
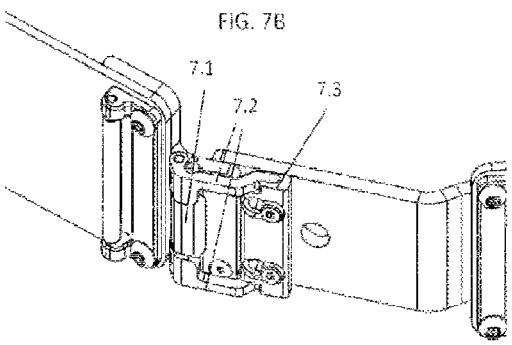

In FIGS. 7A-B, the hinge on the sacral plate 6.2 is seen working in its normal function as a means of aiding normal ingress to and egress from the vest. In this position, the bale 7.1 is held securely within a single or any suitable number of closed pelican clips 7.2 to preserve the rigidity necessary for the vest to function optimally. The pelican clips 7.2 are in turn held in place by a keeper 7.3.

Figure 7C:
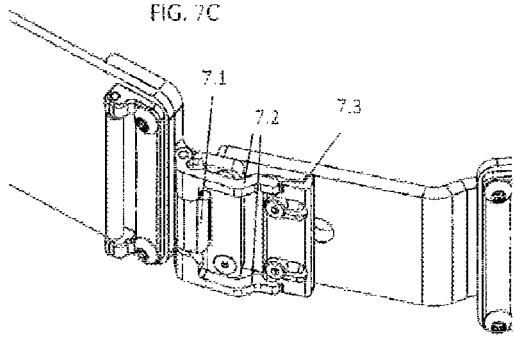
Figure 7D:
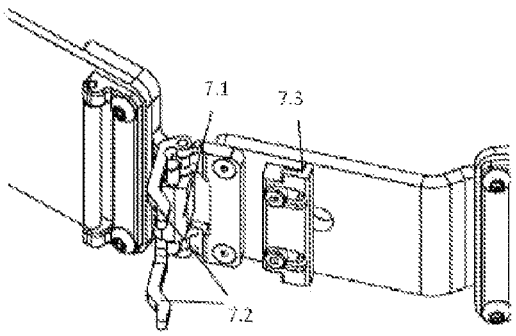
Figure 7E:
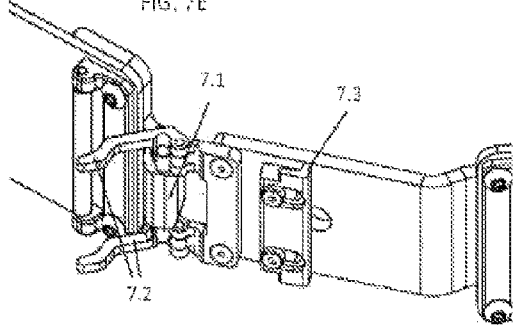
Figure 7F:
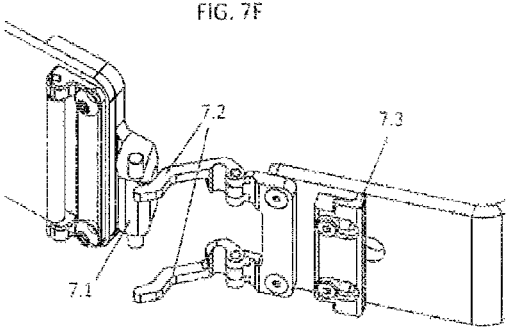

In case of emergency, the entire supported load including the vest may be jettisoned, un-encumbering the wearer so as to escape any hazardous environment or circumstance. To activate the emergency quick-release, the wearer manipulates a handle or lever (not shown?) located within reach on the ventral side of the vest, for example. This handle or lever action is transmitted by means of cords or cables (not shown?) to both hinge/release mechanisms simultaneously. The transmitted action moves the keeper 7.3 away from the hinge freeing the pelican clip or clips 7.2 as shown in FIG. 7C. Because the bail 7.1 is held eccentrically within the clips 7.2, tension within the vest forces the clip or clips to fly open, as shown in FIG. 7D releasing the bail, as shown in FIG. 7E and allowing it to disengage entirely from its hinge, as depicted in FIG. 7E. When both sacral and dorsal quick-releases 7A, 7B are activated, the supported load causes the vest to move rapidly towards the load. If the wearer simultaneously lets go of the load, the apparatus uncouples from the wearer leaving him or her unimpeded.

Embodiments of the invention have been described, with numerous possible elements. The invention is not limited to the specific embodiment disclosed, and may include different combinations of the elements disclosed or omission of some elements, and the equivalents of all such structures. Although an ideal result is described with respect to minimizing or reducing pressure on various parts of a user's body, and it is possible to achieve this result with certain elements described, not all embodiments will necessarily have features that overcome all problems with the prior art.

The invention claimed is:

1. A support vest comprising:
a waistband;
shoulder straps configured to be disposed over a wearer's shoulders;
a ventral vest portion extending from the waistband to the shoulder straps;
a dorsal vest portion extending from the waistband to the shoulder straps;
a load attachment component;
the ventral vest portion attaches at the sagittal plane inferiorly to the waistband through an inferior ventral pivot system at an inferior end of the ventral vest portion;
the dorsal vest portion attaches at the sagittal plane inferiorly to the waistband through an inferior dorsal pivot system at an inferior end of the dorsal vest portion
wherein the ventral vest portion and the dorsal vest portion attach at the sagittal plane superiorly to the shoulder straps through a superior ventral pivot system at a superior end of the ventral vest portion, and through a superior dorsal pivot system at a superior end of the dorsal vest portion, respectively; and
wherein the support vest is rigid in the sagittal plane and flexible in the coronal plane.

2. The support vest of claim 1 wherein:
the ventral vest portion includes:
a ventral spar member; and
a ventral plate;

the ventral spar member extends upward from the waistband and is attached to the waistband through the inferior ventral pivot system;

the dorsal vest portion includes:
  a dorsal spar member; and
  a dorsal plate;
  the dorsal spar member extends upward from the waistband and is attached to the waistband through the inferior dorsal pivot system;

the superior end of the ventral spar member is attached to the ventral plate through the superior ventral pivot system;

the superior end of the dorsal spar is attached to the dorsal plate through the superior dorsal pivot system;

the ventral plate and the dorsal plate are connected to one another by the shoulder straps; and.

3. The support vest of claim 2 wherein the attachment point of the ventral spar member to the ventral plate and the attachment height of the dorsal spar member to the dorsal plate are at substantially the same height.

4. The support vest of claim 2 wherein the ventral and dorsal spar members are extendible and collapsible a telescoping mechanism.

5. The support vest of claim 4 wherein the vertical spar members are extendable ventrally and dorsally to mid-thoracic level.

6. The support vest of claim 2 wherein the support vest is configured to transmits the bulk of the load into the ilia inferiorly, and the remainder into the trapezius muscle superiorly of the wearer.

7. The support vest of claim 2 wherein the ventral and dorsal spar members are substantially symmetrical to one another.

8. The support vest of claim 2 further comprising:
  dorsal iliac pads disposed on the interior of the waistband on either side of the attachment area of the dorsal spar member;
  one or more dorsal-plate pads disposed on the interior side of the dorsal plate;
  a pair of shoulder strap pads disposed on the interior side of the shoulder straps;
  one or more dorsal rod pads disposed on the interior side of the dorsal spar;
  ventral iliac pads disposed on the interior of the waistband on either side of the attachment area of the ventral spar member; and
  one or more ventral plate pads disposed on the interior side of the ventral plate.

9. The support vest of claim 8 wherein the dorsal and ventral iliac pads are adjustable along the waistband.

10. The support vest of claim 2 wherein the pivot systems include limiting adjustments to limit rotation.

11. The support vest of claim 1 wherein the load attachment component is adjustable.

12. The support vest of claim 2 further comprising:
  waistband straps;
  wherein the shoulder and waistband straps comprise a multiple-purchase adjustment system and the multi-purchase system on the straps is capable of transferring forces from the ventral side of the support vest to the dorsal side.

13. The support vest of claim 12 wherein the multiple-purchase adjustment systems comprise interlocking semi-rigid slides.

14. The support vest of claim 2 comprising a superior dorsal combination hinge and quick-release system disposed at the superior end of the dorsal spar member and an inferior dorsal combination hinge and quick-release system disposed at the inferior end of the dorsal spar member.

15. The support vest of claim 2 wherein the pivot systems are configured to work around a lower axis and an upper axis, the lower axis corresponds to the rotation of the pelvic girdle while walking and the upper axis corresponds to the rotation of the shoulder girdle when one arm is moved to a different height than the other arm.

16. The support vest of claim 15 wherein the lower pivot system is configured to allow a point to remain at a substantially constant level thereby minimizing the rise and fall of a supported load.

17. The support vest of claim 1 wherein the waistband is semi-rigid.

18. The support vest of claim 1 further comprising an additional load attachment component wherein the load attachment components are located ventrally and dorsally.

19. A support vest having a semi-flexible exoskeletal structure configured to conform to a wearer's natural movements, allowing forces to be applied to selected areas, and permitting attachment of a supported load, the support vest comprising:
  a waistband;
  shoulder straps configured to be disposed over a wearer's shoulders;
  a ventral vest portion configured to extend from the waistband to the shoulder straps;
  a dorsal vest portion configured to extend from the waistband to the shoulder straps;
  a load attachment component;
  wherein the ventral vest portion and the dorsal vest portion are attached inferiorly to the waistband through an inferior ventral pivot system at an inferior end of the ventral vest portion, and through an inferior dorsal pivot system at an inferior end of the dorsal vest portion, respectively; and
  wherein the ventral vest portion and the dorsal vest portion are attached superiorly to the shoulder straps, through a superior ventral pivot system at a superior end of the ventral vest portion, and through a superior dorsal pivot system at a superior end of the dorsal vest portion, respectively;
  the waistband is semi-rigid;
  the ventral vest portion includes a ventral spar member extending upward from the waistband;
  the dorsal vest portion includes a dorsal spar member extending upward from the waistband;
  a superior end of the ventral spar member is attached to a ventral plate;
  a superior end of the dorsal spar is attached to a dorsal plate;
  the shoulder straps are adjustable and semi-rigid and connect the ventral plate and the dorsal plate to one another;
  the ventral spar member and the dorsal spar member are attached inferiorly to the waistband through the inferior ventral pivot system and the inferior dorsal pivot system, respectively;
  the ventral spar member and the dorsal spar member are attached superiorly to the ventral plate and dorsal plate respectively, through the superior ventral pivot system and the superior dorsal pivot, respectively;
  an additional load attachment component wherein the load attachment components are located ventrally and dorsally; and
  waistband straps;

wherein the shoulder and waistband straps comprise a multiple-purchase adjustment system and the multi-purchase system on the straps is capable of transferring forces from the ventral side of the support vest to the dorsal side.

* * * * *